A. SHELBURNE.
AIR BRUSH.
APPLICATION FILED MAR. 2, 1921.
1,398,920. Patented Nov. 29, 1921.
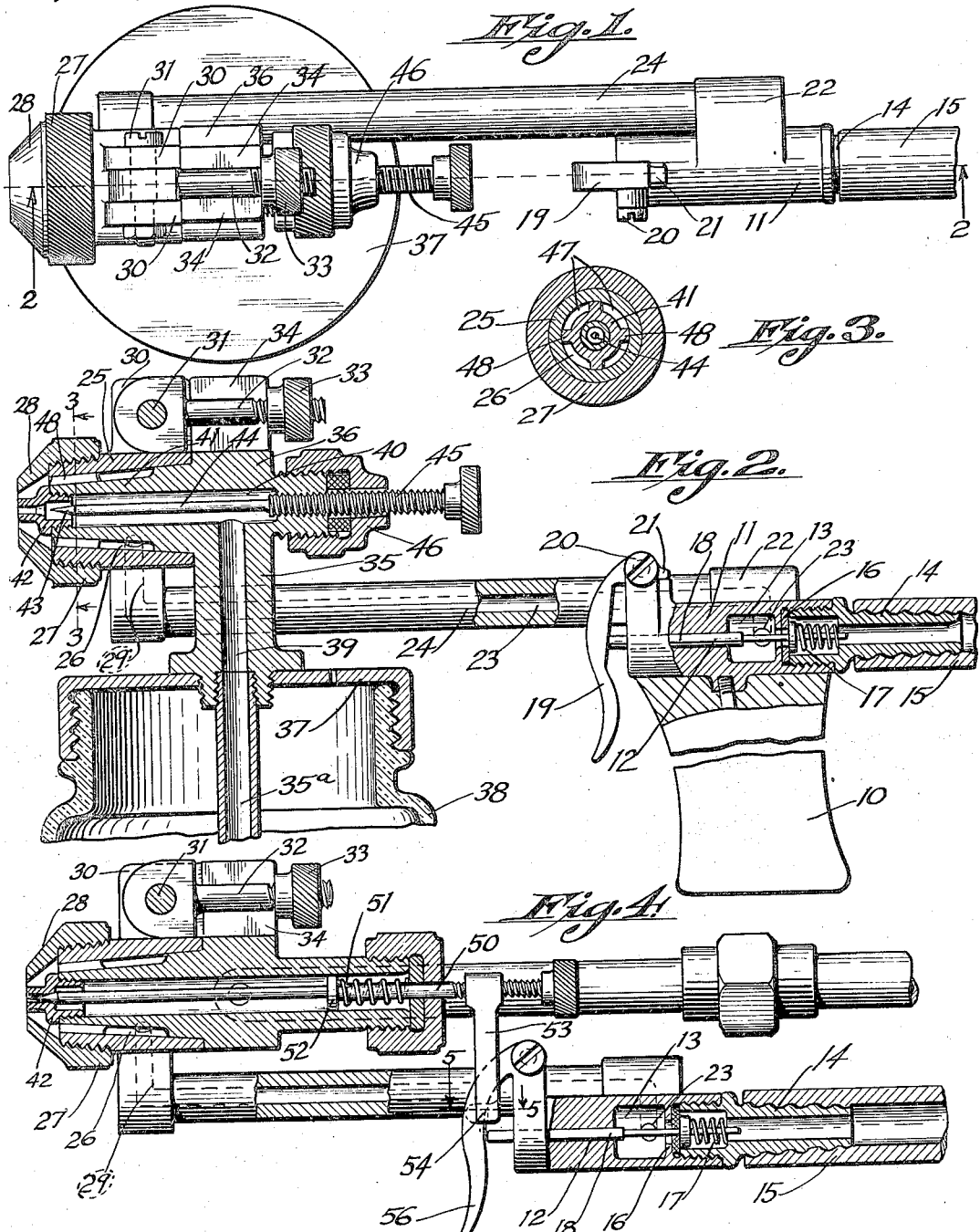
Inventor:
AUGUSTINE SHELBURNE
BY Hazard & Miller
Attorneys.

UNITED STATES PATENT OFFICE.

AUGUSTINE SHELBURNE, OF SOUTH PASADENA, CALIFORNIA.

AIR-BRUSH.

1,398,920.   Specification of Letters Patent.   Patented Nov. 29, 1921.

Application filed March 2, 1921. Serial No. 449,157.

*To all whom it may concern:*

Be it known that I, AUGUSTINE SHELBURNE, a citizen of the United States, residing at South Pasadena, in the county of Los Angeles and State of California, have invented new and useful Improvements in Air-Brushes, of which the following is a specification.

My invention relates to an air brush or implement that is designed for use in the mechanical arts for spraying liquids such as paint, disinfectant and the like, the principal object of my invention being to provide a relatively simple and practical form of air brush and spraying implement and to construct the same with a readily detachable nozzle that will enable the implement to be quickly changed from one class of work to another and consequently widening the scope of usefulness of said implement.

Further objects of my invention are to generally improve upon and simplify the construction of the existing types of air brushes; to provide an implement that is capable of being easily and cheaply produced; and, further, to equip the implement with relatively simple means for controlling the passage of air currents and liquids through the implement, and consequently, providing a device which is very effective and efficient in use.

With the foregoing and other objects in view, my invention consists in certain novel features of construction and arrangement of parts that will be hereinafter more fully described and claimed, and illustrated in the accompanying drawings, in which—

Figure 1 is a top plan view of an air brush of my improved construction.

Fig. 2 is a vertical section taken approximately on the line 2—2 of Fig. 1.

Fig. 3 is a cross section taken on the line 3—3 of Fig. 2.

Fig. 4 is a section similar to Fig. 2 and showing a modified form of air brush.

Fig. 5 is an enlarged detail section taken approximately on the line 5—5 of Fig. 4.

Referring by numerals to the accompanying drawings, which illustrate a practical embodiment of my invention, 10 designates the handle of wood, rubber or analogous material and preferably of the pistol grip type, and secured in any suitable manner to the upper end of said handle, is a horizontally disposed cylindrical member 11 through which is formed an axially disposed bore 12, the same communicating with a chamber 13.

Screw seated in the rear end of cylindrical member 11, is a nipple 14 to which is adapted to be connected a conduit 15 such as a section of rubber hose, and which latter leads from a suitable source of compressed air supply.

Formed in member 11 between the inner end of nipple 14 and chamber 13, is a valve seat 16, and adapted to rest thereupon and cut off communication between the passagewage through the nipple 14 and the chamber 13, is a spring pressed valve 17, the same being carried by a stem 18 and the latter being arranged for sliding movement in bore 12. The forward end of stem 18 projects a short distance beyond the corresponding end of cylinder 11, and said projecting end is adapted to be engaged by a trigger 19 that is pivotally mounted at 20 on top of member 11 and said trigger being provided adjacent to its pivot point with a projecting lug 21 that is adapted to engage a part of cylinder 11 to limit the outward swinging movement of the lower portion of said trigger.

Formed integral with the central portion of cylindrical member 11, is a laterally projecting block 22, and formed therethrough is a port 23 the inner end of which communicates with chamber 13. Projecting forwardly from the outer portion of block 22 is a horizontally disposed tubular member 24, the passageway through which communicates with the outer end of port 23, and formed integral with or fixed to the forward end of said tubular member 24 and offset from the axis thereof, is a horizontally disposed cylindrical member 25 through which is formed a tapered opening 26.

Screw seated on the outer end of member 25 is a ring 27, and formed integral with the outer end thereof, is a relatively short conical nozzle 28.

The forward end of the passageway through tubular member 24 communicates by means of a short lateral passageway 29 with the tapered opening 26 through member 25.

Formed integral with the top of member 25, is a pair of ears 30, in which is seated a transversely disposed pin or screw 31, and pivotally mounted thereon between said ears, is one end of a swinging bolt 32, the threaded end of which carries a nut 33.

The vertically disposed leg 35 of an inverted L-shaped fitting 36 carries at its lower end an internally threaded cap 37 that is adapted to engage the threaded neck of a liquid container 38, and which latter may be the form of an ordinary Mason jar.

Formed on top of fitting 36 are upwardly projecting spaced ears 34 between which bolt 32 is adapted to be positioned when member 25 carrying the nozzle 28 is applied to said fitting 36.

Formed through the vertical leg 35 of fitting 36, is a passageway 39, the upper end thereof communicating with a passageway 40 that is formed through the horizontal leg 41 of the fitting 36.

Screw seated in the outer end of a horizontal member 41, is a relatively small nozzle 42 that is concentrically arranged in the tapered opening through conical nozzle 28, and the relatively small opening through nozzle 42 is adapted to be closed by the tapered end 43 of a needle valve 44, which latter extends through passageway 40 and is carried by an adjusting screw 45, the latter being seated in a packed bearing 46 that is arranged at the rear end of member 41.

The outer portion of tubular member 41, or that portion within the tapered opening 26 in member 25, is reduced in diameter, thereby forming an annular space or chamber 47 between said member 41 and the member 25, and projecting outwardly from the forward end of this reduced portion of member 41 is a series of radially disposed lugs 48 that serve to firmly hold the outer end portion of member 41 in a central position within the chamber 26 in member 25.

In the operation of this form of my improved air brush, cap 37 is screw seated on the upper end of a container 38, which latter is filled or partially filled with the liquid that is to be sprayed, and a feed tube such as 35ª is connected to the lower end of member 35 and extends downwardly into the jar or container 38.

The operator manually engages handle 10, and as trigger 19 is pulled inwardly with the index finger, valve 17 is unseated, thereby permitting compressed air from the source of supply to which flexible tube 15 is connected to flow through nipple 14 into chamber 13, and from thence through port 23, tubular member 24 and port 29 into annular chamber 47, and said air passes from said chamber outwardly through the orifice in conical nozzle 28. The siphonic action of the compressed air discharging from the conical nozzle 28 creates suction through passageways 40 and 39 through fitting 36 and through tubular member 35ª, with the result that liquid from the container 38 will be drawn upwardly through tubular member 35ª and the passageway through fitting 36, and said liquid will discharge through the jet nozzle or nipple 42 at the forward end of member 41, it being understood that the tapered forward end 43 of valve stem 44 is withdrawn from its seat by proper manipulation of screw 45 and that the latter may be adjusted so as to regulate the flow of liquid through the nipple or nozzle 42. The liquid thus drawn upwardly through fitting 36 and discharged from the nozzle at the forward end thereof, will be thrown forwardly on to the work in the form of a fine spray, and which action is produced in practically all forms of air brushes or atomizers.

My improved construction of air brush makes it possible to quickly change the air control valve and the air nozzle 28 from one container to another; and which action is very desirable where the work requires the use or application of paints or pigments of different colors.

A number of containers 38 may be provided, the same containing differently colored paints or pigments and each container is fitted with a cap 37 carrying the fitting 36, and when it is desired to change the air valve and nozzle from one container to another so as to spray a differently colored paint or pigment, nut 33 is unscrewed for a short distance upon the threaded end of bolt 32 in order to permit the latter to be swung upward, out of engagement with the ears 34, and when thus released, tubular member 25 carrying the air nozzle 28 can be readily detached from member 41 and quickly applied to the angular fitting 36 on another container. This interchangeability of the combined air valve and air nozzle member of the device is effective in saving much time, labor and expense in the operation of air brushes, particularly where different colors of paint or pigment are to be applied to the work.

The modified form of device illustrated in Fig. 4 is particularly adapted for use where the liquid to be sprayed is fed to the air brush by gravity or from a pressure tank, and in this form of device, the liquid control valve is operated from the same trigger that operates the air control valve.

In the construction of this modified form of device, the liquid control valve stem 50 is provided with an expansive spring 51 that bears against a shoulder or washer 52 that is located upon said valve stem, thereby tending to normally maintain the tapered end of said stem upon its seat, and adjustably arranged upon the rear outer end of said valve stem, is a depending arm 53, the lower end of which carries a horizontally disposed U-shaped member 54.

This U-shaped member is adapted to be occupied by the trigger 56 that actuates the air inlet valve, and thus as said trigger is drawn inwardly to open the air inlet valve, the valve stem 50 will be reacted or drawn rearwardly so as to open the vent or orifice through the liquid discharge nozzle or nipple.

An air brush of my improved construction possesses superior advantages in point of simplicity, durability and general efficiency, and as the implement is equipped with interchangeable parts, much time and labor can be saved in the use of the implement; particularly where different liquids or different colors of paint are to be applied to the work.

It will be readily understood that minor changes in the size, form, and construction of the various parts of my improved air brush may be made and substituted for those herein shown and described without departing from the spirit of my invention, the scope of which is set forth in the appended claims.

I claim as my invention:

1. In an air brush, the combination with an angular fitting through which is formed a liquid passageway and one leg of said angular fitting being tapered, of a tubular member applied to the tapered leg of said fitting, a conical air nozzle carried by said tubular member and a pivotally mounted adjustable link that forms readily releasable means for securing said tubular member to said angular fitting.

2. In an air brush, a fitting provided with a liquid passageway, a portion of said fitting being tapered, a jet nozzle located in the end of the tapered portion of said fitting, a tubular member detachably mounted on the tapered portion of the fitting, a conical jet nozzle carried by said tubular member and inclosing the jet nozzle in the end of the tapered portion of said fitting and a pivotally mounted adjustable link forming readily releasable means for securing said tubular member to said fitting.

3. In an air brush, a fitting provided with a projecting tapered portion through which is formed a liquid passageway, a jet nozzle seated in the end of said tapered portion, a tubular member detachably mounted on the tapered portion of the fitting, a pivotally mounted adjustable link forming readily releasable means for securing said tubular member to said fitting, there being an annular chamber formed between said tapered portion of the fitting and the tubular member which annular chamber is adapted to receive air under pressure, and a conical jet nozzle carried by said tubular member and inclosing the jet nozzle in the end of the tapered portion of the fitting.

4. In an air brush, a fitting provided with a projecting tapered portion through which is formed a liquid passageway, a jet nozzle seated in the end of said tapered portion, a tubular member detachably mounted on the tapered portion of the fitting, a pivotally mounted adjustable link forming readily releasable means for securing said tubular member to said fitting, there being an annular chamber formed between said tapered portion of the fitting and the tubular member, which annular chamber is adapted to receive air under pressure, a conical jet nozzle carried by said tubular member and inclosing the jet nozzle in the end of the tapered portion of the fitting, and adjustable means for controlling the flow of liquid through the jet nozzle in the end of the tapered portion of the fitting 5. In an air brush, a fitting having a hollow tapered portion, a jet nozzle located in the outer end thereof, a pair of ears on said fitting, a tubular member removably positioned on the tapered portion of the fitting, a jet nozzle carried by said tubular member and inclosing the jet nozzle in the end of the tapered portion of the fitting, and a member pivotally mounted on the tubular member and adapted to engage the ears on the fitting to retain said tubular member in operable position upon said fitting.

6. In an air brush, a fitting provided with a tubular extension, the same gradually tapering toward its outer end, a tubular member removably positioned on said tapered projecting portion, a pivotally mounted adjustable link forming readily releasabe means for securing said tubular member to said fitting, a portion of the tapered projection being cut away to form an annular chamber between said tapered projection and the tubular member, spacing members arranged between the outer portions of the tapered projection and the tubular member, a jet nozzle seated in the outer end of the tapered tubular projection, and a jet nozzle carried by the outer end of the tubular member and inclosing the first mentioned jet nozzle.

7. In an air brush, a fitting provided with a tubular extension, the same gradually tapering toward its outer end, a tubular member removably positioned on said tapered projecting portion, a portion of the tapered projection being cut away to form an annular chamber between said tapered projection and the tubular member, spacing members arranged between the outer portions of the tapered projection and the tubular member, a jet nozzle seated in the outer end of the tapered tubular projection, a jet nozzle carried by the outer end of the tubular member and inclosing the first mentioned jet nozzle, and a pivotally mounted adjustable link that forms readily releasable means for securing the tubular member in position upon the tapered tubular extension.

In testimony whereof I have signed my name to this specification.

AUGUSTINE SHELBURNE.